United States Patent [19]

Schneider et al.

[11] 4,120,185

[45] Oct. 17, 1978

[54] CONTROL SYSTEM FOR OPERATING STEPS OF A PRESS AND/OR TRANSFER MECHANISM

[75] Inventors: Franz Schneider; Helmut Braitinger; Burkhard Schumann, all of Göppingen, Fed. Rep. of Germany

[73] Assignee: L. Schuler GmbH, Fed. Rep. of Germany

[21] Appl. No.: 651,531

[22] Filed: Jan. 22, 1976

[30] Foreign Application Priority Data

Jan. 23, 1975 [DE] Fed. Rep. of Germany ....... 2501637

[51] Int. Cl.² .......................... B21D 43/02; B21J 7/46
[52] U.S. Cl. ............................................. 72/24; 72/23; 72/22; 72/21; 72/421; 83/396; 83/72; 100/99
[58] Field of Search .................................. 72/21-25, 72/404, 405, 421, 419, 425, 420, 8, 26, 27; 83/72, 225, 396, 399, 400, 76; 100/99, 43, 48; 214/1 PE, 1 C; 318/39, 601, 602, 640

[56] References Cited

U.S. PATENT DOCUMENTS

| 2,909,769 | 10/1959 | Spaulding | 318/601 X |
|---|---|---|---|
| 3,080,840 | 3/1963 | De Man | 214/146.5 |
| 3,285,044 | 11/1966 | Gregson et al. | 72/421 |
| 3,329,806 | 7/1967 | McCauley | 318/39 X |
| 3,442,168 | 5/1969 | Gatto | 83/354 |
| 3,451,299 | 6/1969 | Pretty et al. | 83/396 X |
| 3,600,993 | 8/1971 | Williams | 83/71 |
| 3,795,851 | 3/1974 | Gage et al. | 318/602 |
| 3,862,564 | 1/1975 | Blase | 72/421 |

FOREIGN PATENT DOCUMENTS

| 1,963,963 | 12/1969 | Fed. Rep. of Germany | 72/419 |
|---|---|---|---|
| 2,053,314 | 10/1970 | Fed. Rep. of Germany | 72/425 |
| 1,627,299 | 8/1971 | Fed. Rep. of Germany | 83/225 |
| 1,024,130 | 3/1966 | United Kingdom | 72/421 |
| 1,425,011 | 2/1976 | United Kingdom | 72/26 |

OTHER PUBLICATIONS

*Product Engineering;* Aug. 21, 1961; Frank Yeaple, "A Round-Up of Angle and Position Measuring Transducers" pp. 33—42.

*Primary Examiner*—Lowell A. Larson
*Assistant Examiner*—D. M. Gurley
*Attorney, Agent, or Firm*—Craig & Antonelli

[57] ABSTRACT

A control system for controlling operating steps of a press and/or transfer mechanism therefor in dependence upon the position of a drive shaft of a drive mechanism of the press. The system includes a coded pulse generator supplying coded pulses indicative of the position of the drive shaft to a decoder from which decoded pulses are supplied to a control pulse distributor to an amplifying unit and appropriate regulating member for regulation of the operating step. A monitoring unit is also provided for monitoring the operation of the control system.

19 Claims, 1 Drawing Figure

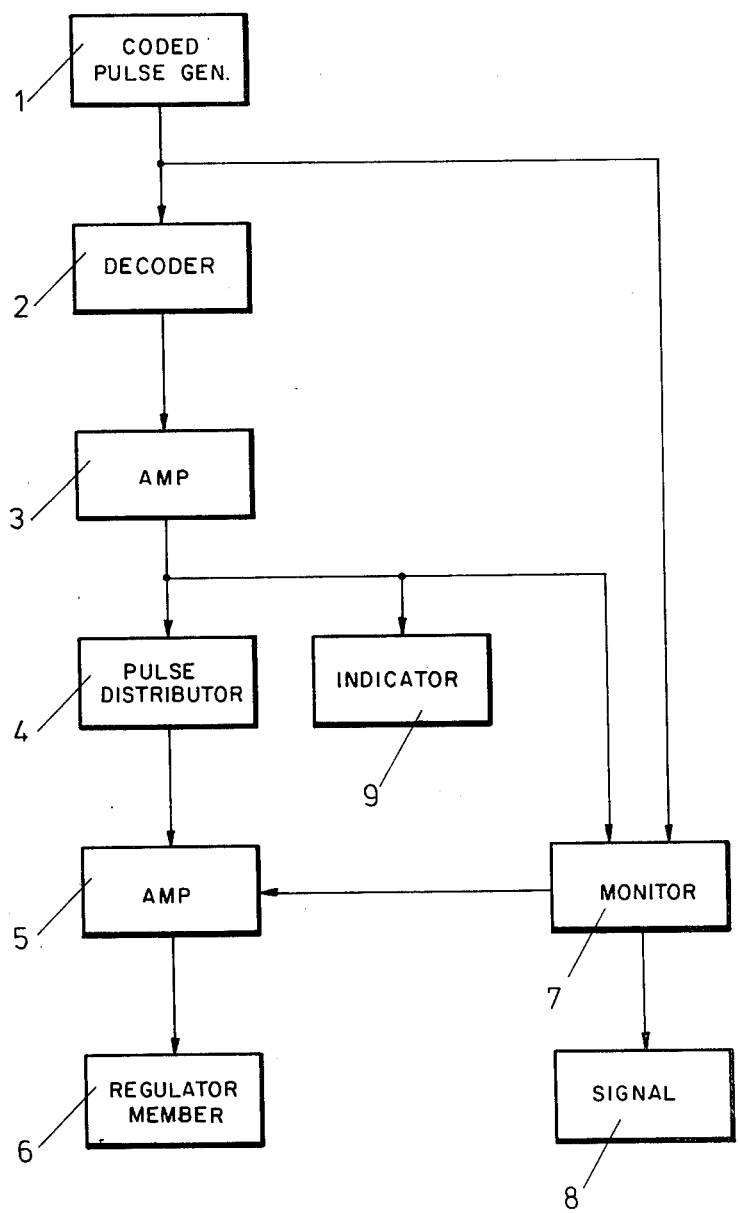

CONTROL SYSTEM FOR OPERATING STEPS OF A PRESS AND/OR TRANSFER MECHANISM

The present invention relates to a control circuit for controlling operating steps in perforating, punching, cutting, and/or shaping presses wherein a pulse generator provides output pulses in dependence on the position of a drive shaft of a drive mechanism for the press, the pulses being transmitted through a pulse distributor to appropriate regulating members for controlling the operating steps.

A conventional control circuit, for example, utilized for a transfer mechanism attached to a press arrangement, is constructed with a pulse generator in the form of a mechanical cam shifting unit with the cam disks of such unit being constructed in correspondence with the operating steps of the transfer mechanism to be controlled. The control pulses produced by the cam shifting unit serves for controlling regulating members of the transfer mechanism in dependence on the position of a drive shaft of a press drive mechanism. The cam shifting unit is designed so that the transfer mechanism is operated in the correct manner in accordance with the position of the drive shaft. Since each operating step must be associated with a cam, such cam shifting units become voluminous and very complicated with a limited resolution being attainable. Furthermore, in case of a tool change, there is the necessity of again adjusting the cam disks of the cam shifting unit and/or the necessity of exchanging the cam disks associated with each cam shifting unit, including the axles which carry these cam disks.

Another conventional control circuit utilizes as the pulse generators, limit switches or the like, arranged on the circumference of a disk rather than the aforementioned cam shifting units. Such a control circuit is for example of the type disclosed in U.S. Pat. No. 3,080,840 which is utilized in a press transfer mechanism. The switches in such arrangement are actuated by a switching arm or the like whereby control pulses are generated corresponding to the respective position of the presses. These control pulses are then fed to the appropriate regulating members by means of an adjustable control pulse distributor.

Both aforementioned constructions, due to the electromechanical character thereof, can be used only to a limited extent in the case of a high stroke rate for the press since, as is known, electromechanical contacts can be operated only up to a limited switching frequency. Furthermore, such constructions result in high wear and tear and in the case of the necessity for high resolution, determined for example by the required number of operating steps, such conventional constructions have a large space requirement.

It is therefore an object of the present invention to provide a control circuit for controlling operating steps in perforating, punching, cutting, and/or shaping presses which overcomes the drawbacks of the prior art constructions.

It is another object of the present invention to provide a control circuit utilizing a pulse generator of compact structure and wear-proof operation having a high degree of reliability and which can be adapted to very high stroke rates of a press.

In accordance with the present invention, there is provided a control circuit utilizing a coded pulse generator or encoder which provides a coded pulse output corresponding to the position of a drive shaft of a press drive mechanism. The coded pulses provided by the encoder is supplied to a decoder for decoding and then supplied to an adjustable control pulse distributor and to the regulating member which controls the operating step.

According to a feature of the present invention, an amplifier having a storage unit is connected before the regulating member and a monitoring circuit is connected with the encoder and decoder as well as being in operative connection with the amplifier.

An advantage of the present invention is that the coded pulse generator or encoder is that since a smaller number of switching points is necessary as compared to an uncoded pulse generator, a small structural size thereof can be provided. Furthermore, a control circuit constructed according to the present invention utilizes primarily wear-proof electronic components which additionally may be arranged in a structural element spatially independent of the presses and transfer mechanism, for example, in a switching cabinet. Moreover, due to the extensively electronic construction of the control circuit, automatic monitoring, optical or acoustical indication of disturbances, as well as an indication of the position of the presses is readily attainable.

These and other objects, features and advantages will become apparent from the following specification and single FIGURE. of the drawing which is a block circuit diagram of the control circuit in accordance with the present invention.

Referring now to the drawing, the control circuit includes a pulse generator 1 in the form of a shaft encoder providing an output to decoder 2. The pulse generator 1 is of a non-contact design and produces coded control pulses corresponding to the position of a drive shaft of a press drive mechanism and may be of the type designated as a shaft position encoder manufactured by Unico, Inc. Racine, Wisconsin. Due to the utilization of a coded pulse generator or encoder, it is possible to effect — if required — a high resolution of a press stroke encompassing 360°. For this purpose, the pulse generator 1 may also be constructed with a disk having concentrically applied pulse markings coded in accordance with a selected code, which pulse markings are scanned by optoelectronic components, e.g., luminescent diodes and photosensitive semiconductors. The coded control pulses from the encoder 1 are decoded in a decoder 2 which for example may be of the type described in Integrated Circuits Catalog from Texas Instruments, Aug. 1, 1969, at pages 5-7 and 5-9. The decoded signals from the decoder 2 are fed via an interposed signal amplifier 3 to an adjustable control pulse distributor 4 constructed, for example as a crossbar distributor. The amplifier may be of the type described in Cardlok Bulletin 1720, at page 28, August 1971 while the crossbar distributor may be of the type illustrated in British Pat. No. 1,223,862. Additionally, the distributor 4 may be any suitable type adjustable control pulse distributor, e.g., a decade switch arrangement, an electronic matrix circuit or the like.

From the distributor 4, an appropriate regulating member 6 is actuated via an amplifying unit 5 by means of the decoded control pulses transmitted thereto. For sake of clarity, only a single regulating member 6, which is associated for example with a transfer mechanism of a press, and an associated amplifying unit 5 is illustrated in the drawing. The amplifying unit 5, includes an amplifier of the aforedescribed type connected with a buffer storage unit of the type for example disclosed in the publication Schaltkreissystem SIMATIC N by Siemens, West Germany, February 1971 at pages 2/14 and 2/18. The regulating member 6 may for example correspond to valve 119 in U.S. Pat. Nos. 3,080,983 or a cylinder-piston unit 68, 69 in 3,061,118.

As is known, when the stroke rate of a press is increased, the control pulses become shorter and the response times of electromechanical storage units, e.g., self-holding relays or contactors of conventional control circuits are too long for such components to respond. Thus, the regulating member 6 can no longer be properly operated and operating failures of the press and/or the associated transfer mechanism to be controlled result. Thus, the electronic storage unit associated with the amplifier in the amplifying unit 5 of the control circuit of the present invention makes it possible to advantageously increase the stroke rate of a press since the response times of the electronic storage units are much smaller than those of heretofore employed electromechanical storage elements.

As shown in the FIGURE, a monitoring circuit 7 is provided for monitoring the coded control pulses from the encoder 1 and the amplified decoded control pulses present at the input of the crossbar distributor 4. The monitoring circuit 7 is also connected to the amplifying unit 5 and, for example, serves for controlling the operation of the amplifying unit to inhibit the operation when a wrongly coded and/or decoded control pulse is present, or also in the case when no control pulse exists. The disturbance is signaled by a fault signaling device 8 connected to the monitoring circuit 7 and which may provide an optical signal via a lamp or an acoustic signal via a signal horn or the like and may also serve for arresting the press and transfer mechanism to be controlled.

The monitoring circuit 7 may be constructed in a manner known in the art from logic elements in the manner indicated in the publication SIMATIC N Static Switching by Siemens, West Germany, December 1972, at pages 53–55. The monitoring circuit also serves to check whether all switching paths required for the resetting of the regulating member 6 have been established in the crossbar distributor 4. This is achieved by applying to the switching paths for the control pulses for resetting the regulating members 6 a signal, e.g., a voltage in the rest position. If this signal is not present, the regulating member 6 then cannot be actuated. The fault signaling device 8 in addition to containing optical or acoustical signaling devices also is provided with a switching unit which is turned on only if all operating voltages required for the operation of the control circuit are present. If any one of these operating voltages is missing, the press, including the transfer mechanism, cannot be operated and the press and/or the transfer mechanism are arrested.

As shown in the drawing, the decoded control pulses which are amplified in the signal amplifier 3 are in addition to being provided to the distributor 4 and monitoring circuit 7 are also supplied to an indicator unit 9 which provides an indication of the position of the drive shaft of the press drive mechanism. Such indication may either be in analog form by means of an indicator needle or an digital form with numerical indication or by discrete luminous elements associated with the inputs of the crossbar distributor 4 which indicator unit may be constructed in a manner known in the art.

The control circuit of the present invention thus makes it possible to initiate and/or terminate operating steps of a controllable tool associated with a press and/or operating steps of a perforating, punching, cutting, and/or shaping press itself, for example, a sheet hold down mechanism associated therewith or for control of the transfer mechanism which may be constructed as a feeding unit or discharge unit for a press as well as a conveyor between two presses.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A control system for controlling operating steps of at least one of a press means and a transfer means therefor comprising coded pulse generating means for providing a coded pulse output in dependence upon the position of a drive shaft of a press drive means, decoding means for decoding the coded pulse output, of the pulse generating means for supplying a decoded pulse output, pulse distributor means for providing an output on at least one of a plurality of output paths in accordance with the decoded output of the decoder means, and at least one regulating means for controlling an operating step being coupled to pulse distributor means for receiving an output therefrom in accordance with the position of the drive shaft of the press means.

2. A control system according to claim 1, wherein the regulating means includes amplifying means for amplifying the output of the pulse distributor means and a regulating member for receiving the amplified output of the pulse distributor means, the regulating member at least one of initiating and terminating an operating step in accordance therewith.

3. A control system according to claim 2, further comprising monitoring means for monitoring the operation of the control system, the monitoring means receiving the outputs of the pulse generator means and the decoder means and being connected with the amplifying means.

4. A control system according to claim 3, wherein the monitoring means detects at least one of improper coding and decoding of the control pulses and the absence of coded and decoded pulses for at least one of inhibiting operation of the amplifying means, signaling the detection of improper operation and arresting the operation of at least one of the press and transfer means.

5. A control system according to claim 4, wherein the amplifying means includes a buffer storage means and an amplifier connected to the buffer storage means.

6. A control system according to claim 5, further comprising fault signaling means connected to the monitoring means, the fault signaling means providing at least one of an optical and acoustic signal in response to the detection of improper operation by the monitoring means.

7. A control system according to claim 6, further comprising means for arresting operation of at least one of the press means and transfer means in response to the detection of improper operation by the monitoring means.

8. A control system according to claim 3, wherein the amplifying means includes a buffer storage means and an amplifier connected to the buffer storage means.

9. A control system according to claim 8, further comprising indicator means connected to the decoder means for indicating the position of the drive shaft of the press drive means.

10. A control system according to claim 9, including an amplifier connected between the decoder means and the pulse distributor means.

11. A control system according to claim 10, wherein the pulse distributor means is a crossbar distributor.

12. A control system according to claim 11, wherein the press means includes at least one of a perforating, punching, cutting and shaping press.

13. A control system according to claim 1, wherein the coded pulse generating means provides coded pulse outputs corresponding to the rotational position of the drive shaft of the press drive means during the rotation thereof.

14. A control system according to claim 13, wherein the coded pulse generating means provides a plurality of coded pulse outputs indicative of the rotational position of the drive shaft irrespective of the stroke rate of the press means.

15. A control system according to claim 14, wherein the press means is a mechanical press.

16. A control system according to claim 14, wherein a plurality of regulating means are provided, the regulating means being responsive to the outputs from the pulse distributor means for controlling the operating sequence of the regulating means in dependence on the rotational position of the drive shaft.

17. A control system for controlling operating steps of at least one of a press means and a transfer means therefor comprising coded pulse generating means for providing a coded pulse output in dependence upon the position of a drive shaft of a press drive means, the coded pulse generating means providing coded pulse outputs indicative of the rotational position of the drive shaft irrespective of the stroke rate of the press means, decoding means for decoding the coded pulse outputs of the pulse generating means for supplying decoded pulse outputs, pulse distributor means for providing an output on at least one of a plurality of output paths in accordance with the decoded outputs of the decoder means, and at least one regulating means for controlling the initiation and termination of an operating step being coupled to the pulse distributor means for receiving an output therefrom in accordance with the position of the drive shaft of the press means so as to control the initiation and termination of the operating step in accordance therewith.

18. A control system according to claim 17, wherein a plurality of regulating means are provided, the regulating means being responsive to the outputs from the pulse distributor means for controlling the initiation and termination of operating steps in dependence on the rotational position of the drive shaft.

19. A control system according to claim 18, further comprising monitoring means for monitoring the operation of the control system, the monitoring means receiving outputs from the pulse generator means and the decoder means so as to ensure proper operation of the control system.

* * * * *